Oct. 23, 1934.  C. A. DONALDSON  1,977,875
ECHO ALTIMETER
Filed May 17, 1930
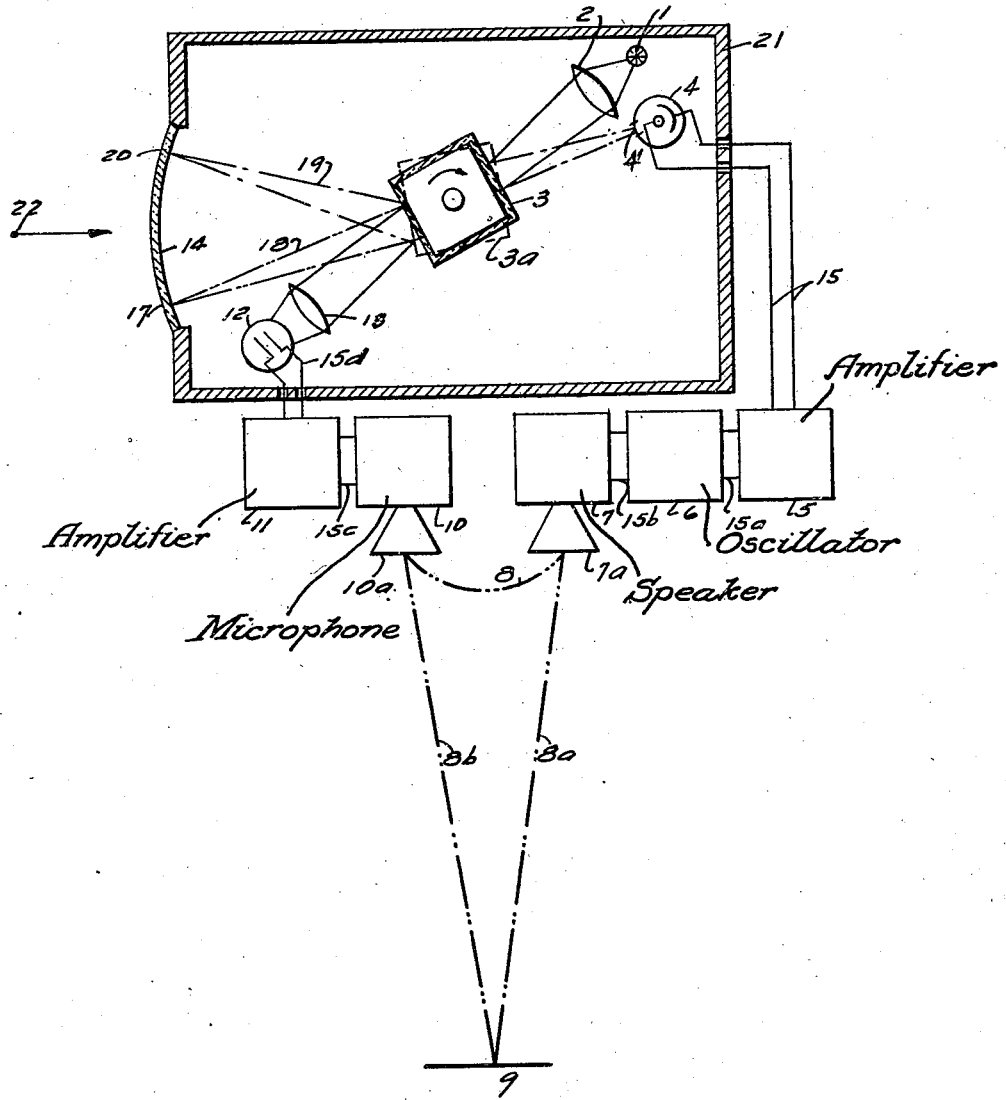

UNITED STATES PATENT OFFICE 1,977,875

ECHO ALTIMETER

Charles Arthur Donaldson, San Antonio, Tex.

Application May 17, 1930, Serial No. 453,259

3 Claims. (Cl. 177—386)

The invention relates to a mechanism for determining the distance and location of immovable objects from a vehicle in which the mechanism is mounted.

The invention is particularly adapted for use in airships or vessels in order that the distance and location of immovable objects may be determined by the transmission of sound waves. It often occurs in aerial navigation and ship travel that it is impossible, due to poor visibility, to determine the location or distance of immovable objects. This is particularly true in aviation where the altitude of the airship or the location of tall buildings or mountains is practically impossible to determine. Various devices have been provided, such as the barometer and compass, which will assist the pilot in determining his altitude or direction. These devices, however, are not entirely satisfactory, and it is with the idea of providing a positive means of determining the altitude or direction of immovable objects or other structures with respect to the airship on which the altimeter is mounted that I have devised the present invention.

It is one of the objects of the invention to provide a set of apparatus which will permit the transmission and receiving of sound waves as an indication of the elapse of time between the transmission and receipt of the reflected wave.

Another object of the invention is to provide a mechanism for transmitting and receiving sound waves, which may be interpreted as an indication of the distance which such waves have travelled before they have been reflected.

Still another object of the invention is to provide a device for transposing light waves into sound waves so that they may be transmitted and received and again transmitting the sound waves into light waves, which may be interpreted as an indication of the distance the sound waves have travelled.

Still another object of the invention is to provide a rotatable reflector, which is adapted to throw a beam of light upon a photo-electric cell so that such beam of light may be transposed into a mechanical vibration, and at the same time this reflector will serve as a receiving mechanism for light waves, which are a transposition of the sound waves, which were previously described.

Still another object of the invention is to provide a mechanism whereby the pilot may definitely determine the direction and location of immovable objects independent of visibility or barometric pressure indicator.

Other and further objects of the invention will be readily apparent to those skilled in the art, when the following description is considered in connection with the accompanying drawing wherein the figure shows a diagrammatical view of my improved mechanism.

In practicing my invention I contemplate the use of sound waves, which may be transmitted in such a manner that they will be reflected and the elapsed time interval between the transmission and the receiving of the reflected waves will be an indication of the distance which these sound waves have travelled. The use of sound waves as the indicating medium is much more satisfactory than the use of light waves, due to the different velocity of the two types of waves. The sound wave travels at such a rate that within reasonable limits the time interval may be readily determined, and, inasmuch as the invention is particularly adapted for use on airships where the distances to be reckoned will be of the degree of thousands of feet or meters, the use of sound waves is very satisfactory, and sound waves of proper magnitude may be readily transmitted. The rate of travel of sound waves is well known for various mediums and temperatures so that a very accurate determination of the distance, which the sound waves have travelled, may be obtained by the use of my mechanism.

The invention may be practiced with various types of mechanism, and in the drawing I have shown one such type, which includes a housing 21. This housing may be of suitable size and is intended to be mounted on the airship or other structure, which is to serve as the transmitter and receiving station, and it is from this station that the distance to the object, which reflects the wave, is to be determined. The housing 21 is adapted to receive the source of light 1, which may be of any magnitude desired so that the beams therefrom will pass through the lens 2. This source of light may be maintained by an electric circuit from a storage battery or by any type of wind driven generator, as desired. The beams of light passing from the light 1 to the lens 2 are indicated by the lines on the drawing. A rotatable mirror or reflector 3 is also mounted in the housing 21, and is arranged to rotate at a uniform speed. This mirror is shown as substantially square in configuration so that the light rays being reflected therefrom will travel at an angle with respect to the lens 2. In the position shown in the drawing the light rays are being reflected so that they impinge upon a photo-electric cell 4. Such cells are of ordinary construction and are provided with a window or aperture 4', which is of such size that the light beams enter for only a fractional part of a second. These photo-electric cells are of such construction that the light beams impinging thereon cause the transmission of electrical impulses. These impulses are adapted to pass from the electric circuit 15 and be received by an amplifier 5.

The amplifier is of usual construction and transmits the impulses to the oscillator 6 by means of the wire 15a. The oscillator 6 is connected by means of the wire 15b to the transmitter or loud speaker 7, which is provided with a horn 7a. With this construction it seems apparent that the beams of light passing through the lens 2 will be instantly transmitted in the form of sound waves from the loud speaker 7a. This transmission will occur at the instant that the rotating reflector 3 is at a position where the beam of light will pass through the aperture 4'.

The sound waves, which are transmitted or broadcasted through this speaker 7a, are adapted to be received by the input horn 10a and the receiver or microphone 10. Thus, these sound waves are transmitted into electrical impulses and pass over the wires 15c to the amplifier 11 where they are in turn transmitted by the wires 15d to the gas-filled tube 12. The horn, microphone and the amplifier just described are of ordinary construction and the gas-filled tube is preferably of the neon type, which I have found satisfactory for my purposes, due to the fact that the light is received and discontinued instantly by such type of tube. A receiving lens 13 is positioned adjacent the tube 12 so that light rays therefrom will be focused on the mirror 3. These rays are also adapted to impinge upon the rotated mirror 3, which has been previously described.

As these rays reflect from the mirror they will pass on to the ground glass scale or other device 14. A zero for this scale has been indicated at 17 and indicates the time during the cycle of operation, at which the sound wave is transmitted by the speaker 7. This sound wave has been indicated diagrammatically by the line 8 and is shown as passing from the transmitter 7a to the receiver 10a. The two opposite sides of the mirror are parallel so that at the instant the light beam from the lamp 1 is transmitted to the photoelectric cell 4, the same wave will be interpreted through the medium of the sound wave 8 into the light beam 18. In other words, the zero point 17 is so positioned on the scale 14 that it will indicate the instant of transmission of the sound wave. The neon tube 12 will receive an impulse at the same instant that the sound wave 8 is transmitted. This impulse results in the light beams 18, and will strike the glass scale at the zero point 17.

The sound waves transmitted at 7a, however, pass in all directions and when such wave is indicated by the line 8a, this wave will travel outwardly from the transmitter and strike an immovable object or other structure 9. In this manner the wave will be reflected and traverse the line 8b until it is received by the microphone 10 or 10a. It seems obvious that there will be a time interval between the receiving of the wave 8 and the wave 8b which will equal the time of travel of the wave from the transmitter to the object and return. During this time interval the rotating mirror 3 will have traversed a certain angular distance so that when the light wave, which is representative of the sound wave 8b, is received upon the rotating mirror, it will have moved to, we will say, the dotted line position 3a.

In such position this light beam will follow the lines 19 and be received upon the scale 14 at a point 20, as viewed from the point 22. The scale 14 may be so arranged that the distance between the points 17 and 20 will indicate either the elapsed time or the distance in feet or meters, which the sound wave has travelled before it was reflected. Any desired type of indicia may be used on this scale to obtain the desired interpretation of the elapsed time interval.

It is intended that the scale 14 will be calibrated to the speed of the rotation of the mirror. This mirror may rotate at any desired speed in order to obtain the interpretation of the rays, which is satisfactory for the purpose in view. The lamp 1 and the lens 2 have been shown as positioned on the opposite side of the mirror from the lamp 12 and lens 13. This is merely an arbitrary location, as obviously, they may be positioned on the same side of the mirror, and, in fact, such positioning would obviate any errors in the construction or grinding of the mirror faces.

While I have shown and described the altimeter in connection with the transmission and receiving of sound waves, it is to be understood that these waves when received may serve as a means to making permanent recordings, photographic imprints or otherwise giving an indication of the distance of the reflecting surface.

It is to be understood that the showing of the drawing is merely diagrammatical and that the transmitter and receiver may be so mounted on the airship or other structure that they may be directed either downwardly or forwardly, with respect to the airship. Thus, if they are directed downwardly the elapsed time during the transmission and receiving of the sound waves will be the indication of the altitude from the earth's surface. The horns may be directed forwardly when it is anticipated that a tall building or a mountain is in the vicinity, and that sound wave will then be an indication of such an object. It is also intended that the device may be used on ships in any desired manner.

What I claim as new is:

1. A device of the character described including in combination a source of light, a photoelectric cell adapted to transmit electric impulses, rotatable reflecting means to periodically cast an impulse from said source of light upon said photo cell, a radio transmitter and speaker connected to said cell whereby said electric impulses are transposed to sound impulses, and means to receive said sound impulses directly and reflected, and additional means including in part said reflector, to determine the time interval elapsing between the receiving of said direct and said indirect sound waves as an indication of the distance of the object which reflected said waves.

2. An altimeter including a source of light, a rotating reflector having a plurality of reflecting surfaces mounted in the path of the rays from said source and adapted to receive and reflect the light from said source, a device for changing light waves reflected from said reflector to sound impulses, means to receive said sound impulses directly and also again when reflected from a solid object, and light emitting means actuated by said sound impulses, said reflector acting to reflect said light from said light emitting means so that the time between said direct and reflected sound waves may be observed, and a screen positioned in the path of said emitted light to receive the light flashes therefrom.

3. An altimeter including a source of light, a rotating reflector means to periodically receive light from said source, a device for changing light waves from said reflector to sound impulses, means to receive said sound impulses directly and also again when reflected from a solid object, and light emitting means actuated by said reflected sound impulses, and means to register the emissions of light from said means as an indication of the altitude of the device with respect to the solid object.

CHARLES ARTHUR DONALDSON.